United States Patent
Rent (10) Patent No.: US 6,721,821 B1
(45) Date of Patent: Apr. 13, 2004

(54) APPARATUS FOR ELECTRONIC DATA STORAGE

(75) Inventor: Thomas M. Rent, Lakeville, MN (US)

(73) Assignee: General Dynamics Information Systems, Bloomington, MN (US)

( * ) Notice: Subject to any disclaimer, the term of this patent is extended or adjusted under 35 U.S.C. 154(b) by 0 days.

(21) Appl. No.: 09/548,716

(22) Filed: Apr. 13, 2000

(51) Int. Cl.[7] .................. G06F 13/00; G06F 13/12; H05K 7/10; H05K 7/14
(52) U.S. Cl. ................. 710/29; 710/33; 709/232; 709/238; 361/600; 361/685; 361/748; 361/760; 439/188; 439/489
(58) Field of Search ............... 710/29, 33; 709/232, 709/238; 439/188, 489; 361/600, 760, 685, 748

(56) References Cited

U.S. PATENT DOCUMENTS

| | | | |
|---|---|---|---|
| 4,870,643 A | | 9/1989 | Bultman et al. ............ 371/11.1 |
| 5,214,567 A | * | 5/1993 | Feightner et al. ........... 361/685 |
| 5,264,975 A | | 11/1993 | Bajorek et al. ........... 360/97.01 |
| 5,556,290 A | * | 9/1996 | Northey et al. ............. 439/188 |
| 5,600,783 A | | 2/1997 | Kakuta et al. ......... 395/182.04 |
| 5,661,636 A | | 8/1997 | Onoda et al. ............... 361/685 |
| 5,822,184 A | * | 10/1998 | Rabinovitz ................... 361/683 |
| 5,844,910 A | | 12/1998 | Niijima et al. ............. 371/10.2 |
| 5,864,661 A | | 1/1999 | Ohara ......................... 714/42 |
| 5,931,697 A | | 8/1999 | Jeong ......................... 439/556 |
| 5,974,490 A | | 10/1999 | Fujimura et al. ........... 710/103 |
| 6,011,741 A | | 1/2000 | Wallace et al. ............. 365/221 |
| 6,035,429 A | | 3/2000 | Shafe .......................... 714/718 |
| 6,059,186 A | * | 5/2000 | Iijima et al. ................. 235/379 |
| 6,073,188 A | * | 6/2000 | Fleming ..................... 710/316 |
| 6,084,773 A | * | 7/2000 | Nelson et al. .............. 361/704 |
| 6,137,678 A | * | 10/2000 | Gebara et al. ........... 312/223.2 |
| 6,199,137 B1 | * | 3/2001 | Aguilar et al. ................ 710/10 |
| 6,347,039 B1 | * | 2/2002 | Lee ............................. 361/760 |
| 6,351,374 B1 | * | 2/2002 | Sherry ........................ 361/685 |
| 6,434,612 B1 | * | 8/2002 | Hughes et al. .............. 709/223 |

* cited by examiner

Primary Examiner—Rehana Perveen
(74) Attorney, Agent, or Firm—Howrey Simon Arnold & White, LLP; Anthony L. Meola (57) ABSTRACT

An apparatus for electronic data storage is disclosed. The apparatus includes any number of discrete data storage devices mounted on a card which readily can be inserted into and removed from an associated piece of electronic equipment, such as a computer. One or more controllers mounted on the card or remotely control the transfer of data to and from each discrete data storage device. Multiple cards containing one or more discrete data storage devices can be arrayed for use in connection with any number of associated electronic apparatus.

3 Claims, 6 Drawing Sheets

APPARATUS FOR ELECTRONIC DATA STORAGE

BACKGROUND OF THE INVENTION

1. The Technical Field

The present invention relates generally to apparatus for electronic storage of data. More particularly, the present invention relates to disk drives and disk controllers for use in computers and other electronic apparatus.

2. The Prior Art

Various types of electronic data storage devices for use in connection with digital computers and the like have been developed over the years. Such devices include floppy disk drives which typically use easily removable and transportable magnetic storage media; hard disk drives which typically use fixed magnetic storage media; tape drives which typically use easily removable and transportable removable magnetic storage media; and optical disk drives, such as compact disk read-only memory (CD-ROM), compact disk read-write (CD-RW), and digital versatile disk (DVD) drives, among others, which typically use easily removable and transportable optical storage media.

A typical computer, especially a microcomputer or personal computer, often includes more than one of such data storage devices. A typical microcomputer, for example, might include an internal, fixed hard disk drive, a 3.5 inch floppy disk drive, and a CD-ROM drive. Each such device typically would be a discrete unit including its own disk controller, and the various devices typically would be independently mounted at various different locations on the computer's chassis. Further, each such device typically would be interconnected with each of the other devices and a disk/bus interface adapter which typically would be mounted on the computer's chassis. Ribbon cable having an inline connector for connection to each such device is commonly used for this purpose.

The foregoing architecture has certain shortcomings. For example, the ribbon cable typically used to interconnect the various data storage devices is costly and prone to damage, particularly as the number of interconnected disk drives increases. Such cable can be easily damaged by persons performing maintenance or repair activities on the computer's chassis. Also, the connectors used in connection with such cables generally are installed at certain predetermined locations, based on the installed locations of the storage devices they are intended to connect to, and they are not readily moved from one location on the cable to another. Consequently, in order to install and connect an additional storage device in a typical personal computer, for example, an additional inline connector must be installed at the appropriate location on the ribbon cable. This procedure requires special tools and skill, and can result in damage to the cable if performed incorrectly. Further, the existing ribbon cable often will be just long enough to interconnect the existing drives in their original locations. If any or all of the existing drives are moved from their original locations to different locations, or if new drives are added, the existing ribbon cable (and its connectors) might need to be replaced in its entirety in order to permit interconnection of the drives in their new layout.

Modern hard disk drives are much less expensive and have much greater storage density than their forerunners. Further, modern disk drive technology allows for smaller, more compact drives than previously possible. In some applications, it may be desirable to use a number of smaller disk drives, rather a single, larger hard drive having the same aggregate storage capacity. For example, it may be easier to package a number of smaller units into a particular space than one larger unit. Also, if a number of smaller units is used in place of a single larger unit, a random failure of a single smaller unit is likely to result in the loss of less data than a random failure of a single larger unit. However, if an application is to include a large number of smaller devices, it becomes impractical to interconnect such units using conventional means, such as the interconnecting cabling described above. Also, because each individual, conventional disk drive typically includes its own dedicated disk controller, an installation using a large number of smaller disk drives would require allocation of a relatively large volume of space to the disk controllers—space that could be better used for data storage.

SUMMARY OF THE INVENTION

The present invention is directed to electronic data storage apparatus having high data accessibility, data transfer rate, fault tolerance, and redundancy, among other characteristics. The present invention allows for interconnection of any number of data storage devices with any number of computers, processors, or other electronic apparatus, with unlimited flexibility.

In a preferred embodiment, one or more data storage devices are mounted on and electrically connected to a card that can be inserted and secured into a receptacle, or slot, in the chassis of a computer or other apparatus. In a preferred embodiment, the data storage devices are miniature hard disk drives. In other embodiments, optical disk drives, flash memory modules, or other types of data storage devices may be used instead of, or in addition to, hard disk drives.

In a preferred embodiment, the card includes a printed circuit portion, and each disk drive mounted onto the card includes output pins similar to the output pins found on a conventional integrated circuit package. In one such embodiment, a disk drive's output pins are soldered directly to the printed circuit, thus securely connecting the disk drive to the card both mechanically and electrically. The disk drive's output pins can be bent pins which are soldered to the printed circuit on the side of the card adjacent to the disk drive, i.e., surface mounted, or they can be straight pins which extend through holes in the card and are soldered to the printed circuit on the side of the card opposite the disk drive. Surface mounting sometimes is preferable because the bent pin structure tends to provide an amount of shock absorption for the disk drive.

In an alternate embodiment, one or more multi-pin electrical connectors are soldered directly to the card and the disk drive's output pins are inserted into corresponding pin receptacles in such connectors. In this manner, the disk drive is electrically and, to some extent, mechanically connected to the card. If additional mechanical support is required to securely fasten the disk drive to the card, it can be provided by using screws, clamps, or other devices to secure the disk drive to the card. This embodiment permits relatively simple replacement of a disk drive once the card it is mounted on has been removed from its associated apparatus because desoldering and resoldering are not required.

In another embodiment, the disk drive includes electrical contact pads instead of, or in addition to, output pins, and the card includes corresponding electrical contact pads which are integral with the printed circuit or are external to, but connected to, the printed circuit. In such an embodiment, the disk drive is placed upon the card so that the electrical contact pads on the disk drive become engaged with the corresponding electrical contact pads on the card, and the disk drive is then secured to the card using screws, clamps, or any other suitable device.

In any of the foregoing embodiments, additional disk drives or other data storage devices may be stacked upon the disk drives or other data storage devices which are mounted directly to the card.

In a preferred form, the card also includes one or more electrical connectors for electrically connecting the card and the disk drives and other circuitry thereon to the card's associated computer or other apparatus when the card is inserted into a slot in the chassis of such a computer or apparatus. Any suitable electrical connector, conventional or custom, can be used for this purpose.

One or more disk controllers are used to control data flow to and from each of the disk drives mounted on a card. In a preferred embodiment, a card includes a single disk controller which controls the data flow to and from each of the disk drives on that card. In an alternate embodiment, a card includes more than one disk controller, each of which is associated with one or more disk drives mounted on that card or on another card. In yet another embodiment, a card has no disk controller thereon, and the data flow to and from the disk drives mounted on that card is controlled by a disk controller which is mounted on a different card or elsewhere within the associated computer or other apparatus with which the disk drives are associated.

In the foregoing embodiments, the card has been described as having a printed circuit portion to which the various disk drives and electrical connectors are electrically connected. In other embodiments, the printed circuit portion may be replaced or supplemented by discrete wires interconnecting the various components mounted on the card.

In an embodiment of the invention, a single card is associated with a single computer or other electronic apparatus, effectively coupling only the disk drives mounted on the card to only that computer in what may be referred to as a one-dimensional array. That is, a single array of disk drives mounted on a single card is associated with a single computer or other electronic apparatus. In another embodiment, more than one card is associated with a single computer or other apparatus, effectively coupling any or all of the disk drives on those cards to only that computer in what may be referred to as a two-dimensional array. That is, two or more arrays of disk drives mounted on two or more cards are associated with a single computer. In yet another embodiment, more than one card is associated with more than one computer, effectively coupling any or all of the disk drives on those cards to any or all of the connected computers in what may be referred to as a three-dimensional array. That is, two or more arrays of disks mounted on two or more cards are associated with two or more computers. In this embodiment, a switch or router is used to direct data between a selected card/disk drive and a selected computer. In further embodiments, multiple arrays of cards can be interconnected with one or more computers in the same manner that multiple arrays of disk drives can be arrayed with computers, as described above.

As illustrated by the foregoing embodiments, the present invention allows unlimited flexibility in interconnecting any number of disk drives with any number of computers, processors, or other electronic apparatus and operating such disk drives in association with such computers or other apparatus. For example, in one possible application, any number of disk drives can be used for data storage for a computer. A number of disk drives can be used for primary data storage and a number of additional disk drives can be used for real-time redundant data storage to prevent loss of data in the event a primary data storage device fails. Further, any number of data storage devices can be provided for use as spares which can be placed into immediate service to replace a failed primary or redundant data storage device. Such spares can be placed into service without taking the computer out of service or otherwise disrupting the computer's operation by simply rerouting data destined for the failed device to the spare device. The computer can be programmed to effect such rerouting automatically upon detecting a disk drive failure.

DETAILED DESCRIPTION OF THE DRAWINGS

Figure 1:
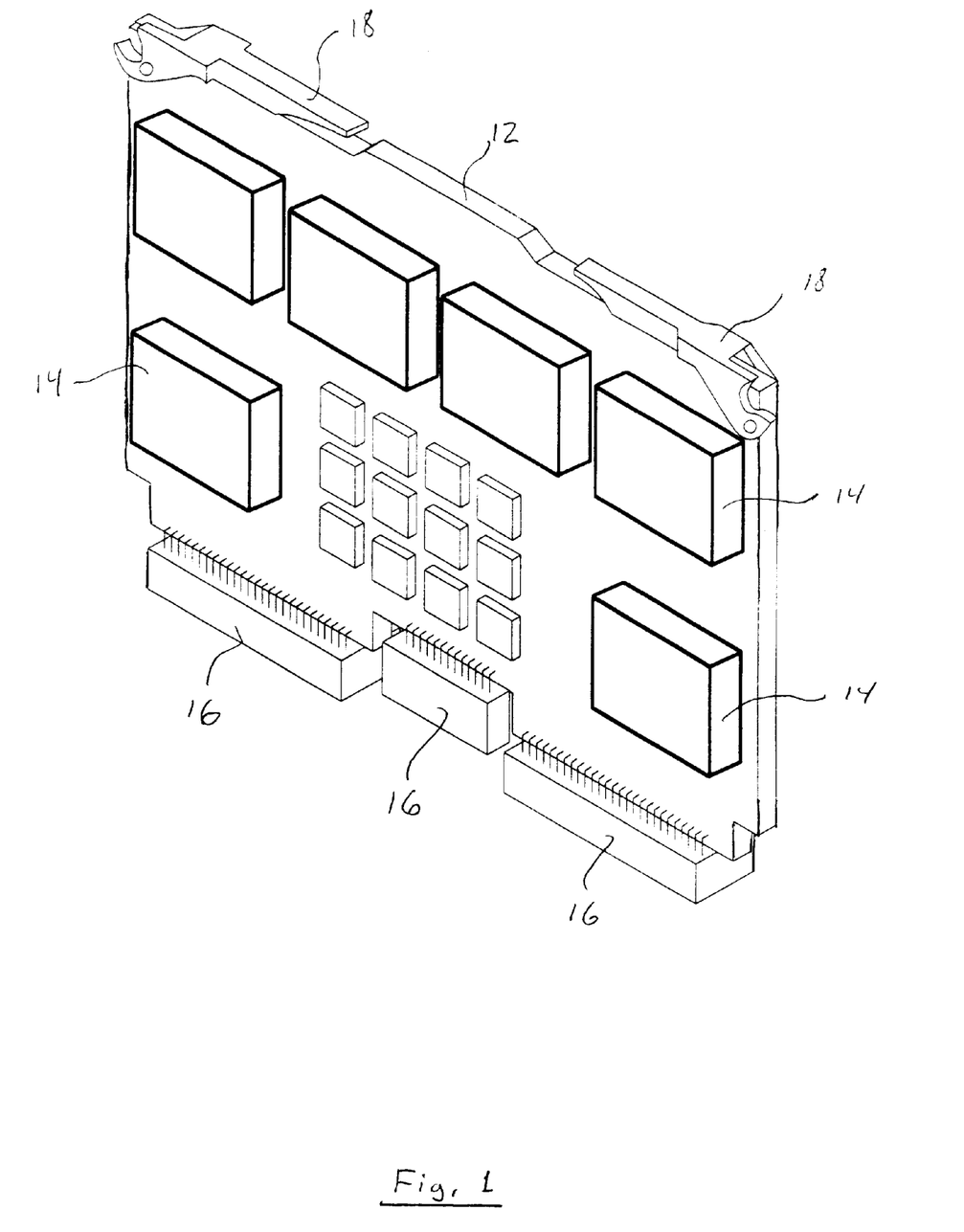
FIG. 1 is a perspective view of a data storage apparatus according to the present invention.

FIG. 1 illustrates a preferred embodiment of a data storage apparatus according to the present invention. The data storage apparatus includes a card 12 onto which one or more data storage devices, such as disk drives, optical drives, tape drives, and flash memory modules, and other components, such as integrated circuits, can be mounted. Preferably, card 12 is configured to be inserted and secured into a mating receptacle, such as slot 22, of a computer chassis or other framework, such as electronic equipment chassis 24. Locking levers 18 on card 12 can be used to secure card 12 into, and to facilitate the release of card 12 from, such a slot or receptacle.

Figures 4, 5, 6:
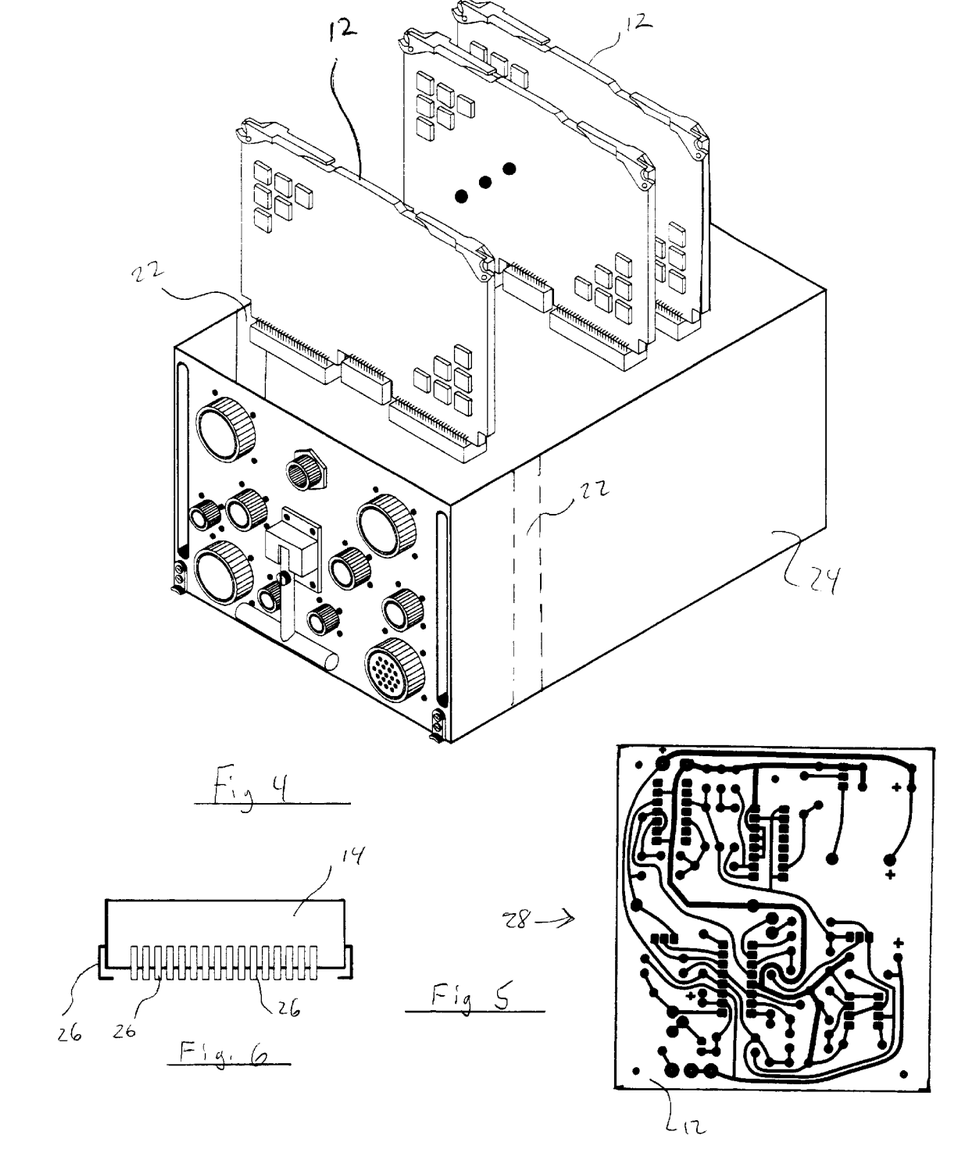
FIG. 4 is a perspective view of an electronic equipment chassis according to the present invention.
FIG. 5 is a plan view of a printed circuit.
FIG. 6 is a side elevation view of a disk drive according to the present invention.

In a preferred embodiment, card 12 includes a printed circuit portion 28, as illustrated in FIG. 5, which will be discussed further below. Preferably, card 12 also includes one or more electrical connectors, such as the multi-pin connectors 16 shown in FIG. 1, each of which engages with a mating connector (not shown) on chassis 24 when card 12 is inserted into slot 22 on chassis 24.

Figure 2:
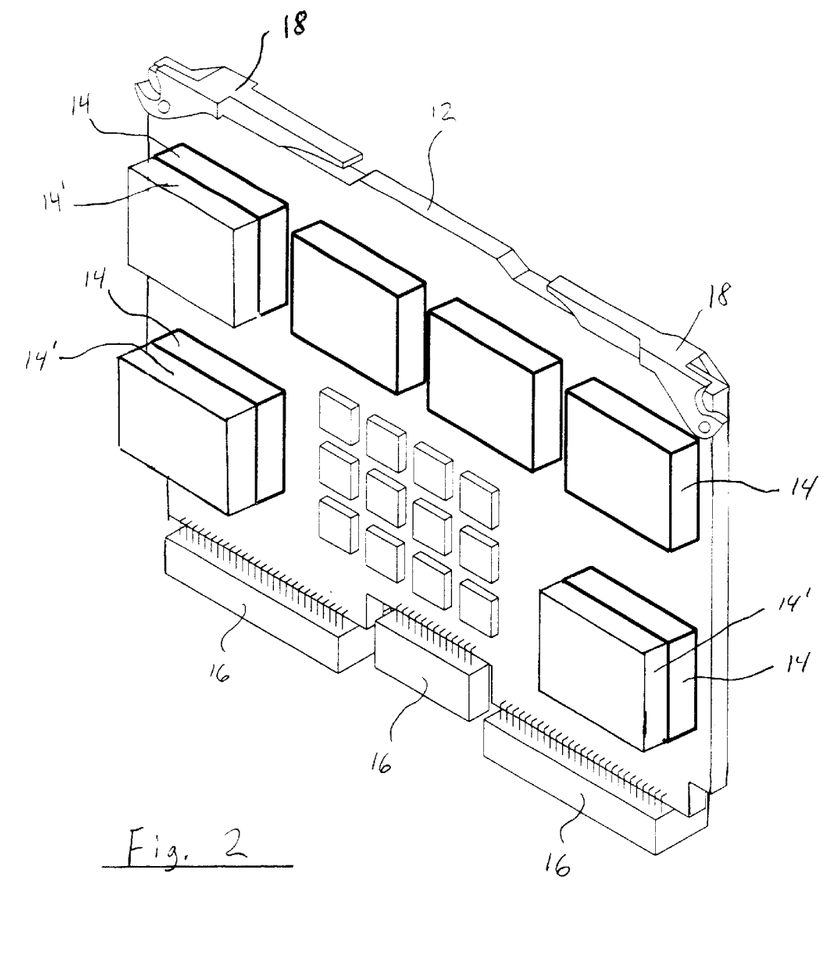
FIG. 2 is a perspective view of an alternate embodiment of an apparatus according to the present invention.

Data storage devices can be mounted onto card 12 in any number of configurations, depending on the relative sizes of card 12 and the data storage devices. For example, in the embodiment illustrated in FIG. 1, six disk drives 14 are mounted directly onto card 12. Further, additional data storage devices can be stacked onto those data storage devices which are mounted directly onto card 12. For example, in the embodiment illustrated in FIG. 2, six disk drives 14 are mounted directly onto card 12, and a disk drive 14' is mounted atop each of three disk drives 14. In other embodiments, additional disk drives (not shown) can be stacked upon any or all of disk drives 14'. Although the embodiments illustrated in the drawings and described herein do not include any data storage devices other than disk drives 14 and 14', disk drives 14 and 14' may be replaced or supplemented by optical drives, flash memory modules, or other data storage devices.

Figure 3:
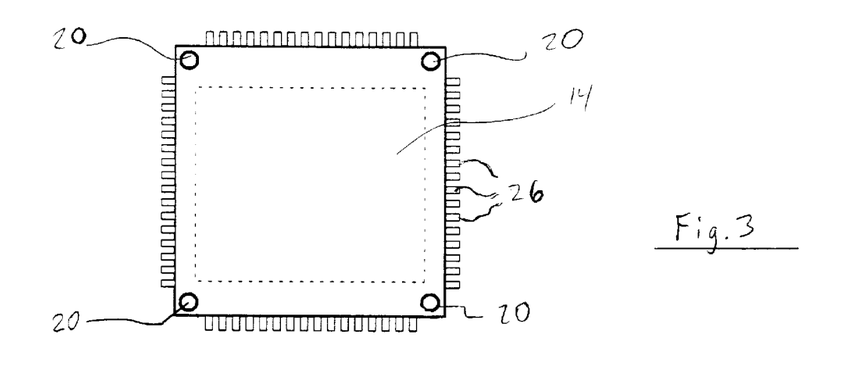
FIG. 3 is a plan view of a disk drive according to the present invention.

Each individual disk drive 14 or other data storage device can be secured to card 12 in various ways. In a preferred embodiment, disk drive 14 includes output pins 26 which are similar to the output pins of an integrated circuit package. In the embodiments illustrated in FIGS. 3, 5, and 6, output pins 26 are bent leads which are soldered to a portion of printed circuit 28 on the surface of card 12 which is adjacent disk drive 14. In other embodiments, output pins 26 are straight leads which penetrate apertures (not shown) in card 12 and which are soldered to a portion of printed circuit 28 on the surface of card 12 which is opposite disk drive 14, as would be known to one skilled in the art. Both of the foregoing embodiments provide for both mechanical and electrical connection of disk drive 14 to card 12.

In an alternate embodiment, a multi-pin electrical connector (not shown) is soldered to printed circuit 28 of card 12 in either manner described above. A disk drive 14 having straight output pins 26 is connected to the multi-pin electrical connector both mechanically and electrically by pushing the disk drive's output pins 26 into the pin receptacles of the connector. This embodiment provides for easy replacement of a disk drive 14 once card 12 has been removed from chassis 24. However, this embodiment does not provide as much mechanical support for disk drive 14 as an embodiment wherein disk drive 14 is soldered directly to printed circuit 28 on card 12. Where additional mechanical support is required, it can be provided by using screws or other suitable fasteners to secure disk drive 14 to card 12. For example, the disk drive 14 illustrated in FIG. 3 can be fastened to a card 12 by inserting a screw (not shown) through each aperture 20 and threading the screw into a corresponding threaded hole (not shown) in card 12. Alternatively, a disk drive 14 can be secured to card 12 using an integrated circuit chip clamp (not shown) of the type which is used to secure a microprocessor chip to the motherboard of a typical personal computer, as would be known to one skilled in the art.

In other embodiments, disk drives 14 can be connected to card 12 using any variety of electrical connection and mechanical attachment. In one such embodiment (not illustrated), the disk drive includes electrical contact pads instead of, or in addition to, output pins, and the card includes mating electrical contact pads. When the disk drive is connected to the card, the electrical contact pads associated with disk drive 14 make contact with the corresponding electrical contact pads associated with card 12. The disk drive can be secured to the card using screws, clamps, or other devices, as described above.

As discussed above and as illustrated in FIG. 2, additional disk drives 14' can be stacked upon disk drive 14 which is mounted directly to card 12. Disk drive 14' can be connected to disk drive 14 in any of the ways that disk drive 14 can be connected to card 12. That is, disk drive 14 can include an electrical connector/pin receptacles (not shown) for receiving the output pins 26 of disk drive 14'. Alternatively, disk drive 14 can have external electrical contacts (not shown) to which the output pins 26 of disk drive 14' can be soldered. Further, disk drive 14 can have one or more electrical contact pads (not shown) configured to mate with one or more corresponding electrical contact pads (not shown) on disk drive 14' when disk drive 14' is attached to disk drive 14. In these embodiments, primary and/or supplemental mechanical support for disk drives 14,14' can be provided using screws, clamps, or any other suitable devices in a manner similar to that described above for embodiments not including additional disk drives 14'.

In a preferred embodiment of the invention, card 12 includes a single disk controller (not shown) which controls the flow of data to and from each disk drive 14,14' on card 12. In other embodiments, card 12 can include multiple disk controllers, each of which is used to control data flow to and from a group of disk drives 14,14' on card 12. In further embodiments, a disk controller on card 12 can control data flow to and from disk drives 14,14' on other cards. Alternatively, a particular card 12 can include no disk controller; in such an embodiment, the flow of data to and from disk drives 14,14' on card 12 is controlled by a disk controller located on another card 12 or elsewhere in the computer or other apparatus associated with card 12.

Figure 7:
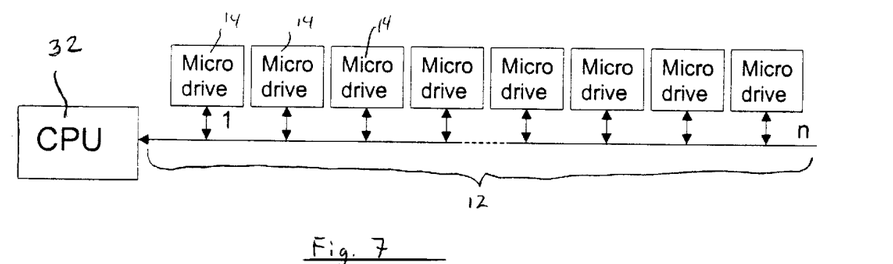
FIG. 7 is a schematic view of an embodiment of a data storage apparatus according to the present invention.
Figure 8:
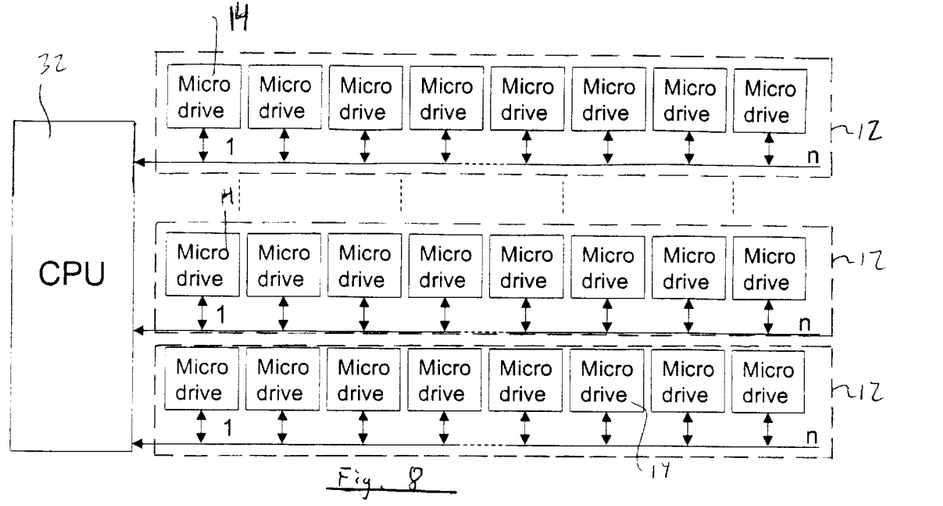
FIG. 8 is a schematic view of a further embodiment of a data storage apparatus according to the present invention.

Any number of cards 12, each having one or more disk drives 14,14', can be associated with any number of computers or other electronic apparatus. For example, as illustrated in FIG. 7, a single card 12 having any number of disk drives 14,14' can be associated with a single central processing unit (CPU) 32 of a computer or other apparatus in what may be referred to as a one-dimensional array. Alternatively, as illustrated in FIG. 8, two or more cards 12 can be associated with a single CPU 32 in what may be referred to as a two-dimensional array.

Figure 9:
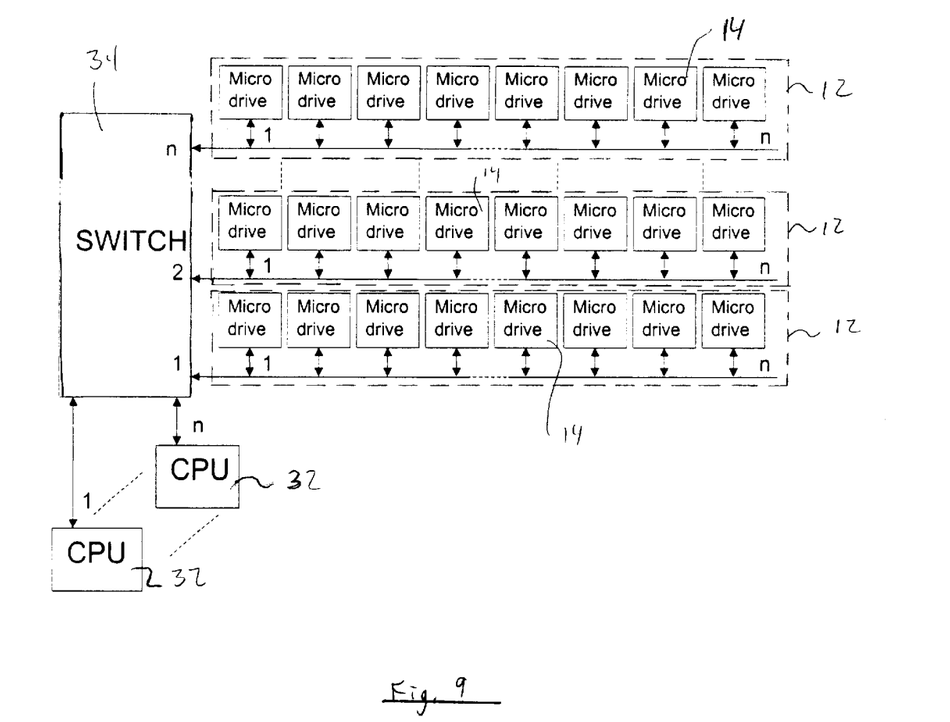
FIG. 9 is a schematic view of another embodiment of a data storage apparatus according to the present invention.

In another embodiment, as illustrated in FIG. 9, two or more cards 12, each having any number of disk drives 14,14', can be associated with two or more CPU's 32 in what may be referred to as a three-dimensional array. In such an embodiment, switch 34 directs data between a selected CPU 32 and a selected card 12 according to instructions provided by CPU 32 and/or the disk controller (not shown) associated with the selected card 12 or group of disk drives 14 on such card 12.

Figure 10:
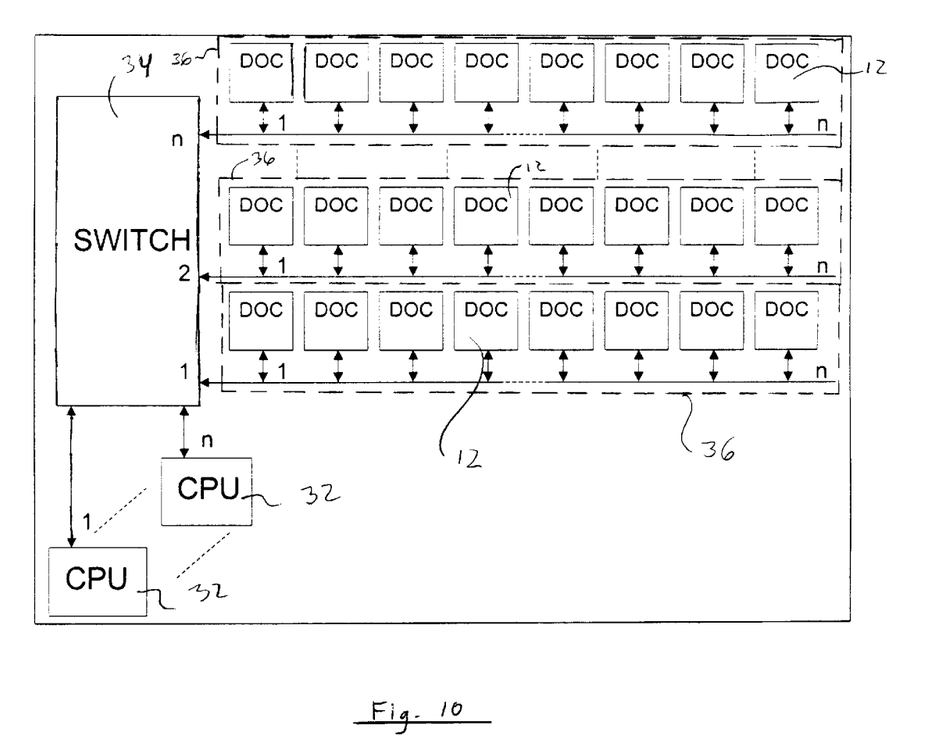
FIG. 10 is a schematic view of yet another alternate embodiment of a data storage apparatus according to the present invention.

Further, as illustrated in FIG. 10, one or more arrays 36 of cards 12 can be associated with one or more CPU's 32. In such embodiments including more than one CPU 32, switch 34 is used to direct data between a selected CPU 32 and a selected array of cards 12. Switch 34 is not required in such embodiments having only one CPU 32.

Figure 11:
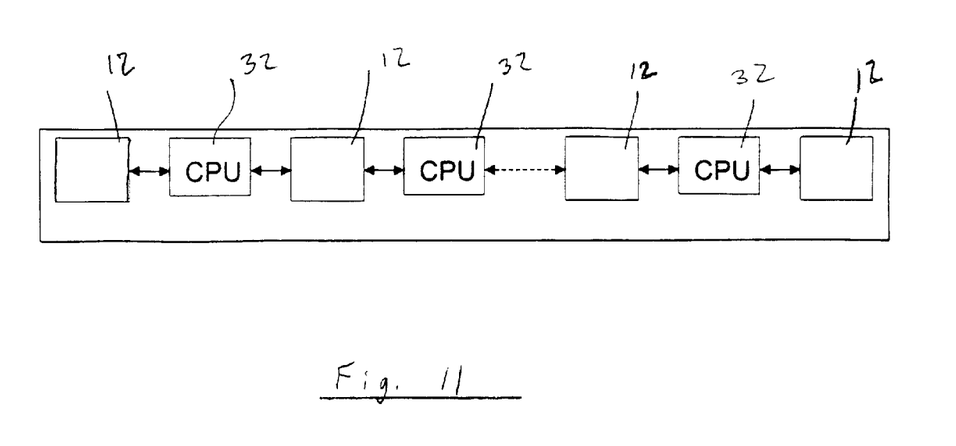
FIG. 11 is a schematic view of still another alternate embodiment of a data storage apparatus according to the present invention.

In the embodiment illustrated in FIG. 11, disk drives 14 or cards 12 having disk drives 14,14' thereon are linked together with CPU's 32 in an alternating fashion. That is, a disk drive 14 or card 12 having disk drives 14,14' mounted thereon is linked to a CPU 32, which is linked to another disk drive 14 or card 12, which is linked to another CPU 32, and so forth. This configuration readily allows for pipelining, as would be known to one skilled in the art. Further, in this configuration, the memory afforded by disk drives 14,14' can supplement or replace solid state memory which ordinarily would be used in connection with CPU's 32.

The foregoing descriptions illustrate that any number of disk drives 14,14' can be interconnected with any number of computers or other electronic apparatus in a wide variety of configurations. However, the foregoing embodiments are merely illustrative and are not to be construed as limiting the scope of the invention. The invention is defined according to the appended claims and is limited only thereby.

What is claimed is:

1. An electronic data storage apparatus comprising:

a substrate adapted for selective insertion into a chassis;

at least one first electronic data storage device connected to said substrate;

said substrate comprising at least one electrical conductor corresponding to said at least one first electronic data storage device; and said at least one first electronic data storage device electrically coupled to said at least one corresponding electrical conductor;

wherein said at least one first electronic data storage device is adapted to receive at least one second electronic data storage device.

2. The apparatus recited in claim 1 further comprising at least one second electronic data storage device connected to said at least one first electronic data storage device.

3. The apparatus recited in claim 2 wherein said at least one second electronic data storage device is electrically coupled to said at least one first electronic data storage device.

* * * * *